United States Patent [19]

McClain

[11] 4,243,762
[45] Jan. 6, 1981

[54] ALKANOLAMINE PROCESSING AID FOR ETHYLENE-VINYL ESTER INTERPOLYMER PARTICLES PRESENT IN AQUEOUS DISPERSIONS THEREOF

[75] Inventor: Dorothee M. McClain, Cincinnati, Ohio

[73] Assignee: National Distillers and Chemical Corp., New York, N.Y.

[21] Appl. No.: 16,217

[22] Filed: Feb. 28, 1979

[51] Int. Cl.³ ............................ C08K 5/16; C08L 33/06
[52] U.S. Cl. .......................................... 525/6; 525/222; 528/492
[58] Field of Search ........................ 528/492; 526/331; 525/222, 6

[56] References Cited

U.S. PATENT DOCUMENTS

| | | | |
|---|---|---|---|
| 2,013,941 | 9/1935 | Young | 526/331 |
| 2,388,225 | 10/1945 | Brooks | 526/331 |
| 3,634,385 | 1/1972 | Walles | 528/492 |
| 4,078,128 | 3/1978 | Hoyt | 526/10 |

*Primary Examiner*—C. A. Henderson
*Attorney, Agent, or Firm*—Kenneth D. Tremain

[57] ABSTRACT

The tendency of ethylene-vinyl ester interpolymer particles containing at least about 25% by weight of copolymerized vinyl ester to coalesce in the aqueous dispersion media in which they are prepared and consequently form unmanageable agglomerates which render impossible or greatly impede the practical filtration of the interpolymer particles, a tendency which becomes more pronounced with increasing vinyl ester content, is substantially diminished by adding an anti-coalescing amount of at least one water soluble alkanolamine processing aid to the aqueous dispersion media, or wash water used in recovery of the polymer particles prior to the recovery of the interpolymer particles therefrom. While in the alkanolamine-wet condition, the ethylene-vinyl ester interpolymer filter cake continues to resist coalescence and as such constitutes an excellent starting material for the preparation of hydrolyzed ethylene-vinyl ester resins by solid phase alcoholysis.

11 Claims, No Drawings

ALKANOLAMINE PROCESSING AID FOR ETHYLENE-VINYL ESTER INTERPOLYMER PARTICLES PRESENT IN AQUEOUS DISPERSIONS THEREOF

BACKGROUND OF THE INVENTION

This invention relates to the fields of ethylene-vinyl ester interpolymers in particulate form and to processes for alcoholyzing such interpolymers to provide vinyl alcohol-containing interpolymers.

The term "ethylene-vinyl ester interpolymer particles" and terms of like import as used herein refer to polymers in particulate form containing interpolymerized ethylene and vinyl ester, including such polymers containing vinyl alcohol units and/or one or more other interpolymerized monomers, which in an untreated state exhibit tackiness and a tendency to coalesce in aqueous dispersions. In general, the tackiness and tendency toward coalescence of the ethylene-vinyl ester resins becomes particularly troublesome when the vinyl ester content of the resins is at least about 25%, these undesirable characteristics asserting themselves in greater degree with increasing amounts of vinyl ester. Tackiness is also influenced by the particle size distribution of the resins such that as the average size of the particles becomes smaller, tackiness increases.

The ethylene-vinyl ester interpolymer powders have a wide variety of applications such as flexibilizers and impact modifiers for other resins, notably, the polyvinyl chlorides, as substrate polymers for graft copolymerization with other monomers and as starting materials for the manufacture of ethylene-vinyl ester-vinyl alcohol terpolymers and ethylene-vinyl alcohol copolymers by alcoholysis. Frequently, an ethylene-vinyl ester interpolymer powder is obtained by the known technique of melt dispersion, i.e., by adding the interpolymer to water maintained at a temperature above the melting point of the resins, adding a suitable dispersing agent to the molten resin mixture, mechanically stirring the mixture to obtain an acceptable dispersion of interpolymer, cooling the aqueous dispersion to at least the solidification point of the molten dispersed interpolymer particles, filtering the solidified particles from the aqueous dispersion medium, and washing and drying the resin particles.

It is known from both U.S. Pat. Nos. 3,780,004 to Hoyt et al. and 3,510,463 to Bristol, and British Pat. No. 1,095,204, that particulate ethylene-vinyl ester interpolymers of relatively low vinyl ester content can be subjected to solid state alcoholysis. But due to the above-noted tendency of ethylene-vinyl ester interpolymers containing at least about 25% vinyl ester to coalesce in aqueous dispersions, attaining a practical rate of filtration of the particles is virtually impossible and the particles comprising the resulting filter cake will, upon drying, coalesce thereby excluding the use of the resin as a suitable source material for the aforementioned applications of ethylene-vinyl ester copolymers. Were it not for this tendency of ethylene-vinyl ester interpolymer particles to coalesce, a tendency which as noted becomes more pronounced with increasing vinyl ester content and diminishing particle size distribution, the direct use of the high surface area particulate filter cake for conversion to particulate vinyl alcohol-containing polymers by solid phase alcoholysis employing caustic alcohol would be economically and technically compelling.

While the use of nitrogen-containing organic materials as anti-blocking or slip agents for ethylene-vinyl ester resins is known, such substances are largely water insoluble solids which form a coating surrounding each resin particle. U.S. Pat. No. 3,474,063 to Powell proposes the use of N,N' dialiphatic thiodipropionamides to improve the anti-blocking and slip characteristics of ethylene-vinyl acetate copolymer. U.S. Pat. No. 3,474,058 to Ridgeway et al. accomplishes these goals employing a combination of a fatty acid salt and a fatty acid amide. In addition to a fatty amide, the ethylene-vinyl ester resins of U.S. Pat. No. 3,463,751 to Hasegawa also require the presence of polyvinyl chloride to exhibit non-blocking characteristics. U.S. Pat. No. 3,396,137 to Wharton discloses N-substituted unsaturated carboxylic amides, and U.S. Pat. No. 3,371,057 to Guttman discloses mixtures of crystalline paraffin wax and N,N-dioleylethylene-diamine, as slip agents for ethylenevinyl ester resins. The use of the foregoing materials to prevent coalescence of ethylene-vinyl ester interpolymer particles in aqueous dispersions is disadvantageous for several reasons. Since the materials are water insoluble, they cannot readily function in aqueous environments, at least without the additional presence of suitable dispersing agents. Moreover, since they cannot be removed by such a simple and inexpensive expedient as water washing, their recovery and reuse are problematical. Ethylene-vinyl ester interpolymer particles which are coated with water insoluble substances are entirely unsatisfactory starting materials for solid phase hydrolysis since the coatings may function as barriers to the caustic alcohol reagents employed in such hydrolysis procedures.

Accordingly, there has heretofore existed a need for an effective water soluble processing aid for ethylene-vinyl ester interpolymer particles contained in aqueous dispersion media, especially one which facilitates the filtration of the particles for subsequent conversion to vinyl-alcohol-containing resins by solid phase alcoholysis.

SUMMARY OF THE INVENTION

It has surprisingly been discovered that if an anti-coalescing amount of a water soluble alkanolamine is added to particulate ethylene-vinyl ester interpolymer in an aqueous dispersion thereof, the tendency of such polymers to coalesce or agglomerate is at least appreciably reduced if not substantially eliminated. In the most preferred form of the invention, an anti-coalescing amount of a water soluble alkanolamine is added to aqueous dispersion media of finely divided ethylene-vinyl ester interpolymer particles containing at least about 25% by weight of vinyl ester accompanied by, or followed with, agitation prior to recovery of the interpolymer particles therefrom, recovery of the particles, e.g., by filtration, can be carried out at practical rates and without formation of aggregates, or agglomerates, of coalesced resin particles. As an alternative, the alkanolamine can be added to suspension of the interpolymer particles in wash water employed in recovery of the polymer particles.

Moreover, no appreciable coalescence of the interpolymer particles comprising the filter cake can take place provided the filter cake is maintained in the alkanolamine-wet condition. In this state, the ethylene-vinyl ester interpolymer filter cake is well suited for direct conversion to vinyl alcohol-containing polymers by solid phase alcoholysis. Generally speaking, the physical effect of hydrolysis on ethylene-vinyl ester interpolymer powders is an increase in their hardness and a suppression or elimination of their tendency to coalesce into clumps even when the powders are in the dry state. By "alkanolamine-wet" is understood that condition of the ethylene-vinyl ester interpolymer particles retained on the filter membrane in which substantially all of the particles are surrounded or coated with a film of dilute or concentrated anti-coalescing alkanolamine.

The term "finely divided" as it applies to the ethylene-vinyl ester interpolymers herein contemplates an average particle size ranging from about 20 up to about 500 microns with from about 80% to about 90% of the particles being less than about 250 microns. With the preferred interpolymers, a substantial majority of the particles are less than about 150 microns, usually ranging from about 20 to about 150 microns, with most of the particles being in the range of from about 50 to about 100 microns. Ethylene-vinyl ester interpolymers having an average particle size less than about 50 microns are most preferred, especially when the interpolymers are to serve as starting materials for conversion to ethylene-vinyl ester-vinyl alcohol terpolymers by solid phase alcoholysis as hereinafter described. The term "rapid filtration" and terms of like import as used herein refer to the relative speeds with which filtration can be accomplished in accordance with the process of this invention for specific ethylene-vinyl acetate interpolymer dispersions compared to the speeds of filtration for the identical dispersions to which an anti-coalescing alkanolamine has not been added. The improvement in filtration speed will vary with the particle size distribution of the dispersed resin. In the smaller average particle size ranges, the benefits conferred by the present process can be quite dramatic, with increases in filtration rate on the order of a factor of five or ten times being typically achieved.

The present invention can also be used in treating the same interpolymers in the form of pellets which also tend to coalesce, particularly on storage. Typically, pellets are formed by extrusion into water used as the cooling liquid of a fly-knife cutter bath. The resin is therefore pelletized in the water bath in which the alkanolamine is dissolved. The thus treated pellets resist coalescence or agglomeration. The cooling water containing the alkanolamine can be recycled and replenished with alkanolamine as necessary. As an alternative, the pellets may be sprayed with, or dipped in, such solution to permit contact with the alkanolamine. For the purpose of this invention, pellets include particles which range up to about ½ inch in diameter and preferably from 1/10 to ⅜ inch in diameter.

As a further embodiment of the invention, finely-divided ethylene-vinyl ester interpolymers can be suspended in an aqueous solution of the alkanolamine processing aid and rendered agglomeration-resistant by such treatment. During such suspension of the polymer, any agglomerates of particles can be broken up by high shear mechanical means such as provided by a blender, e.g., Waring blender.

As should be apparent, many variations of the embodiments of the invention are possible, particularly when employed in conjunction with the formation of finely-divided dispersions by the use of dispersing agents in aqueous systems. In general, the particulate, finely divided polymer can be rendered agglomeration-resistant by addition of the alkanolamine to the dispersion medium or to the wash waters employed in working up the dispersed product or the alkanolamine treatment of the dispersed polymer may be affected as a separate follow-up treatment of the finely-divided polymer after recovery from the dispersion media.

The invention will be described in terms of the preferred form of the invention.

DESCRIPTION OF THE PREFERRED EMBODIMENTS

The alkanolamine processing aids which are useful herein to prevent coalescence of the ethylene-vinyl ester interpolymer powders in their aqueous dispersions can be selected from among any of the primary, secondary and tertiary alkanolamines, including those compositions having more than one hydroxyl and/or amine function, which are soluble in water to the extent of at least about 4 g/100 g water at 25° C. Among the alkanolamines which can be used herein with good results are ethanolamine, 2-dimethylaminoethanol, 2-diethylaminoethanol, triethanolamine, 2-(2-aminoethylamine)ethanol, 2-methylaminoethanol, 2-amino-2-methyl-1-propanol, 2-butylaminoethanol, diethanolamine, 2-anilinoethanol, 2,2'-(methylimino)diethanol, 2,2'-(ethylimino)diethanol, 1-(2-aminoethylamino)-2-propanol, and the like. The alkanolamines selected for use herein are advantageously those having relatively high boiling point, i.e., comparatively low volatilities, so as to minimize loss during the drying of the filtered resin particles. A preferred alkanolamine for use in this invention is diethanolamine.

The quantities of alkanolamine processing aid employed will, of course, vary according to the tendency of the ethylene-vinyl ester interpolymer powder to coalesce, which as stated above, is a function of the vinyl ester content and particle size distribution of the interpolymer. Other factors influencing the level of use of the alkanolamine processing aid include the concentration of the interpolymer powder in the dispersion media, the nature and amount of the dispersant agent(s) and the presence of diluents, e.g., water, in the alkanolamine. Simple and routine experimentation can readily establish the optimum quantity of anti-coalescing alkanolamine processing air required for a particular ethylene-vinyl ester interpolymer particle dispersion. For most such dispersions, from about 0.1% to about 10% by weight alkanolamine based on the weight of dispersed ethylene-vinyl copolymer will provide entirely acceptable results with from about 1% to about 5% of alkanolamine being preferred. Amounts of alkanolamine processing aids in excess of the upper end of the aforestated range are not harmful but are advantageously avoided as unnecessary. The alkanolamine can be added as such to the aqueous dispersion media containing the resin particles but more usually will be added as a solution, commonly in water as the solvent, but in other water soluble solvents such as the alkanols, notably, methanol, or ethanol, as well. The aqueous dispersions of interpolymer can be obtained herein in accordance with any of the known particle-forming dispersion techniques including those requiring the use of soaps and those calling for the use of polyoxyalkylene surface active agents as in U.S. Pat. Nos. 3,418,265; 3,422,049 and 3,522,036.

The alkanolamine-wet filter cake can, if desired, be washed with additional portions of alkanolamine processing agent in order to remove any vestiges of dispersing agent and/or water accompanying the freshly filtered resin. The alkanolamine present in the filtrate following its purification and reconcentration by known and/or conventional means can be recycled to be added as processing aid to additional quantities of ethylene-vinyl ester interpolymer dispersion.

The ethylene-vinyl ester interpolymers which are susceptible to treatment with an alkanolamine processing aid in accordance with this invention are normally solid at room temperature. Preferably, such interpolymers comprise copolymers of ethylene and a vinyl ester such as vinyl formate, vinyl acetate, vinyl trimethylacetate, vinyl propionate, vinyl butyrate, vinyl trifluoroacetate, and the like. The interpolymers contain at least about 25% vinyl ester by weight and can contain up to about 95% vinyl ester by weight. Partially hydrolyzed ethylene-vinyl ester copolymers are also suitable for use herein provided they contain at least about 30% unhydrolyzed vinyl ester groups by weight. Minor amounts of one or more other monomers copolymerizable with ethylene and vinyl ester, e.g., amounts of up to about 10% by weight of total comonomers, can be contained in the interpolymer as, for example, carbon monoxide, methyl acrylate, n-butyl acrylate, di-n-butyl maleate, diethyl itaconate, acrylic acid, methacrylic acid, fumaric acid, and so forth. While the invention herein is described and illustrated in connection with facilitating the processing of ethylene-vinyl acetate interpolymers, it is understood that the advantages of this invention are also conferred upon the processing of other ethylene vinyl ester copolymers which are present in aqueous dispersion media.

The advantages of this invention are particularly realized when the filtered ethylene-vinyl ester interpolymer particles are to be employed as source materials for solid phase alcoholysis into vinyl alcohol-containing interpolymers. The very high surface area presented by the non-coalesced alkanolamine-wet ethylene-vinyl ester interpolymer filter cakes results in efficient and rapid alcoholysis of the interpolymers and provides free flowing hydrolyzed powders even after drying.

When the resins dispersions are prepared by a melt dispersion technique employing a surface active dispersing agent in the manner previously described, it is generally advantageous to recover the resin particles admixed with a residual amount of the surfactant as the presence of the latter has been found to facilitate contact of the alcoholysis catalyst with the resin thereby accelerating the alcoholysis reaction. Accordingly, it is further within the scope of the present invention to directly hydrolyze the alkanolamine-wet ethylene-vinyl ester interpolymer filter cake obtained in accordance with this invention to provide non-blocking ethylene-vinyl ester-vinyl alcohol terpolymers and ethylene-vinyl alcohol copolymers. In order to maintain the freshly filtered interpolymer in the wet condition it may be necessary from time to time to add additional quantities of alkanolamine processing aid. Advantageously, the particles comprising the alkanolamine-wet ethylene-vinyl ester interpolymer filter cake will have diameters averaging less than about 500 microns, preferably in the range of from about 1 to about 100 microns, with particle diameters of less than about 50 microns being especially preferred. The alcohol selected for accomplishing the alcoholysis reaction herein can be selected from among any of the alcohols heretofore known or used for this purpose, for example, the monohydroxyl alcohols having up to four carbon atoms, i.e., methanol, ethanol, n-propanol, isopropanol, n-butanol, sec-butanol, tert-butanol, and the like. Methanol and ethanol are especially preferred for the alcoholysis reaction.

As recognized in the art, any of a variety of alkaline materials can be utilized as catalysts for the alcoholysis reaction. The preferred catalyst is an alkali metal or alkaline earth metal alkoxide of the alcoholyzing alcohol added to the filter cake, e.g., sodium ethoxide, potassium isopropoxide, potassium-tert-butoxide, magnesium ethoxide, and the like. These catalysts can be added as such or can be prepared in situ by the reaction of the alcoholyzing alcohol with such alkali metal and alkaline earth metal compounds as lithium hydroxide, sodium hydroxide, potassium hydroxide, magnesium hydroxide and calcium hydroxide.

Although widely varying proportions of ethylene-vinyl ester interpolymer particles and alcoholyzing alcohol can be employed herein, it is generally preferred to employ only as much of the alcohol as is necessary to achieve the desired level of alcoholysis within a reasonable reaction time. Ratios of 1.5:1 to 3:1 alcohol to dry polymer by weight are entirely suitable and provide good results.

The alcoholyzing alcohol, in the presence of the basic catalyst, effects alcoholysis of the vinyl ester repeating units in the interpolymer, reacting with the same to form vinyl alcohol repeating units in the interpolymer and the by-product acylate ester of the alcoholyzing alcohol. The alcoholyzing alcohol is present in the reaction medium in an amount at least stoichiometrically equivalent to the number of moles of the vinyl ester repeating units to be alcoholyzed. Alcoholysis temperatures of from about 0° C. to about 150° C., and preferably from about 30° C. to about 100° C., can be employed. The alcoholysis reaction can be conducted at ambient pressure or at superatmospheric pressures of up to about 5,000 p.s.i. Reaction times can be broadly varied; thus, the alcoholysis can be carried out for periods of from about 1 second to about 2 hours and preferably, from about 15 seconds to about 15 minutes.

The alkanolamine-wet ethylene-vinyl ester interpolymer particulate mass is combined with the alcoholysis medium with the temperature, pressure and reaction times regulated as aforesaid. The medium is desirably maintained substantially free of water and the reaction is carried out under a dry, preferably inert, atmosphere. Residual water present in the filter cake following filtration can be conveniently removed from the interpolymer particles in preparation for alcoholysis through one or more washings with alkanol solutions of alkanolamine processing aid.

The following examples are illustrative of the use of anti-coalescing alkanolamine processing agents in aqueous dispersions of ethylene-vinyl ester interpolymer particles in accordance with this invention.

EXAMPLE 1

Into a 1-liter Parr pressure reactor equipped with stirrer, heating jacket, and thermocouple, was introduced 200 g of VYNATHENE EY 901 (U.S. Industrial Chemicals Company), an ethylene copolymer in the form of pellets (nominally about ⅜ of an inch in diameter), containing 42.7 weight percent of combined vinyl acetate and having a melt flow rate of 1.6 g/10 min. (ASTM D 1238, Condition B); 400 ml. of distilled water, 20 g Pluronic F-98 (BASF Wyandotte Ind. Chem.

Group), a nonionic surfactant formed by condensing propylene oxide with propylene glycol, and 2 g of diethanolamine. The reactor was sealed and heated to 150° C. whereupon stirring at 3700 rpm was initiated and continued for 7 minutes. During this period dry ice was applied to the outside of the reactor to provide rapid cooling. After the 7-minuted rapid stirring period, stirring was continued at a slower rate. When its internal temperature had fallen below 90° C., the reactor was opened. The dispersion was filtered and the collected particles were washed with water containing about 1-2% of diethanolamine. The particles did not cake together and could always be broken up and redispersed. When dry, the product comprised fine agglomerates which stuck together slightly, but could always be broken up.

EXAMPLE 2

Using the procedure of Example 1, a dispersion was made from 150 g of the copolymer of Example 1, 412 ml. of distilled water, and, as dispersant, 53.6 g of Triton X-200 (Rohm and Haas Company), the sodium salt of alkylaryl polyether sulfonate, with 2 g of sodium hydroxide. The temperature at the start of the 7-minute dispersing period (3700 rpm) was 202° C. Dry ice was applied to the reactor in the second minute of the 7-minute period, at the end of which period the temperature had fallen to 176° C. After cooling to 100° C., the reactor was opened; 100% of the copolymer was dispersed to a very fine dispersion. A portion of the dispersion (approximately 60 g) was filtered and washed with water. It showed the same behavior as dispersions of this copolymer made with Pluronic dispersants: the filter cake coalesced.

Thereafter 90 g polymer was cleaned up by first filtering, redispersing the filter cake in a Waring blender in 300 ml. of water containing 1.5% of diethanolamine, refiltering and repeating this washing two more times. The final filter cake contained 52.4% of water. A portion of the final filter cake was dried at room temperature after breaking up in a Waring blender. The dried product was made up of small aggregates of particles exhibiting slight coalescence, but which could be broken apart.

EXAMPLE 3

Three portions of tacky, nominally ⅜-inch pellets of an ethylene-vinyl acetate copolymer containing about 40 weight percent of combined vinyl acetate were coated with 0.1 weight percent of different candidate liquid anti-coalesce agents. The anti-coalescing agents were dissolved in acetone, the pellets were placed in the solution and the acetone was then driven off. The dry coated pellets were then tested for compaction resistance by applying a weight of 1 p.s.i. for 24 hours at 120° F. (49° C.) The results are given in the following Table.

TABLE

| Anti-coalescing Agent | Results of Compaction Test |
|---|---|
| None (control) | Compacted; difficult to break up |
| Diethanolamine | Some compaction; much easier to separate than control |
| Triethanolamine | Pellets easily separated |
| Silicone Oil | Compacted; worse than control |

TABLE-continued

| Anti-coalescing Agent | Results of Compaction Test |
|---|---|
| (Dow-Corning 200) | |

What is claimed is:

1. In a process for recovering finely divided ethylene-vinyl acetate interpolymer particles containing at least about 25% by weight, but not more than about 95% by weight, of copolymerized vinyl acetate from aqueous dispersion media in which the particles are present in admixture with a surface active dispersing agent, the improvement which comprises adding an anti-coalescing amount of water soluble alkanolamine processing aid to the said interpolymer particles in said aqueous dispersion media or to the wash water employed in the recovery of said interpolymer particles from said dispersion media and recovering the so-produced interpolymer particles to provide substantially aggregate-free, alkanolamine-wet ethylene-vinyl acetate interpolymer particles.

2. The process of claim 1 wherein from about 0.1% to about 10% by weight alkanolamine processing aid based on the dispersed ethylene-vinyl acetate interpolymer is added to the aqueous dispersion.

3. The process of claim 2 wherein from about 1% to about 5% by weight alkanolamine processing aid based on the dispersed ethylene-vinyl acetate interpolymer is added to the aqueous dispersion.

4. The process of claim 1 wherein the interpolymer particles are recovered by filtration to provide an alkanolamine-wet filter cake.

5. The process of claim 1 in which the alkanolamine-wet interpolymer particles are washed with additional alkanolamine processing aid to remove residual amounts of water associated with the freshly recovered interpolymer particles.

6. The process of claim 1 in which the alkanolamine processing aid is at least one member of the group consisting of ethanolamine, 2-dimethylaminoethanol, 2-diethyl-aminoethanol, triethanolamine, 2-(2-aminoethylamino)ethanol, 2-methylaminoethanol, 2-amino-2-methyl-1-propanol, 2-butyl-aminoethanol, diethanolamine, 2-anilinoethanol, 2,2'-(methylimino)diethanol, 2,2'-(ethylimino)diethanol, and 1-(2-amino-ethylamino)-2-propanol.

7. The process of claim 1 in which the alkanolamine-wet interpolymer particles are alcoholyzed to provide an ethylene-vinyl acetate-vinyl alcohol terpolymer or ethylene-vinyl alcohol copolymer.

8. A dry free-flowing powder comprising (a) a blend of particles of less than 500 microns of ethylene-vinyl acetate interpolymer wet with an aqueous solution containing from about 0.1% to about 10% by weight of alkanolamine based on the weight of said interpolymer, said copolymer comprising at least about 25% by weight, but not more than about 95% by weight, of combined vinyl acetate units, and (b) particulate polyvinyl chloride.

9. The powder of claim 8 in which the alkanolamine is diethanolamine.

10. A blend of the powder of claim 8 with particulate polyvinyl chloride.

11. Substantially free-flowing dry-blendable pellets of ethylene-vinyl acetate interpolymer wet with an aqueous solution containing from about 0.1% to about 10% by weight of alkanolamine based on the weight of said interpolymer, said interpolymer comprising at least about 25% by weight, but not more than about 95% by weight, of combined vinyl acetate units.

* * * * *